Figure 1:
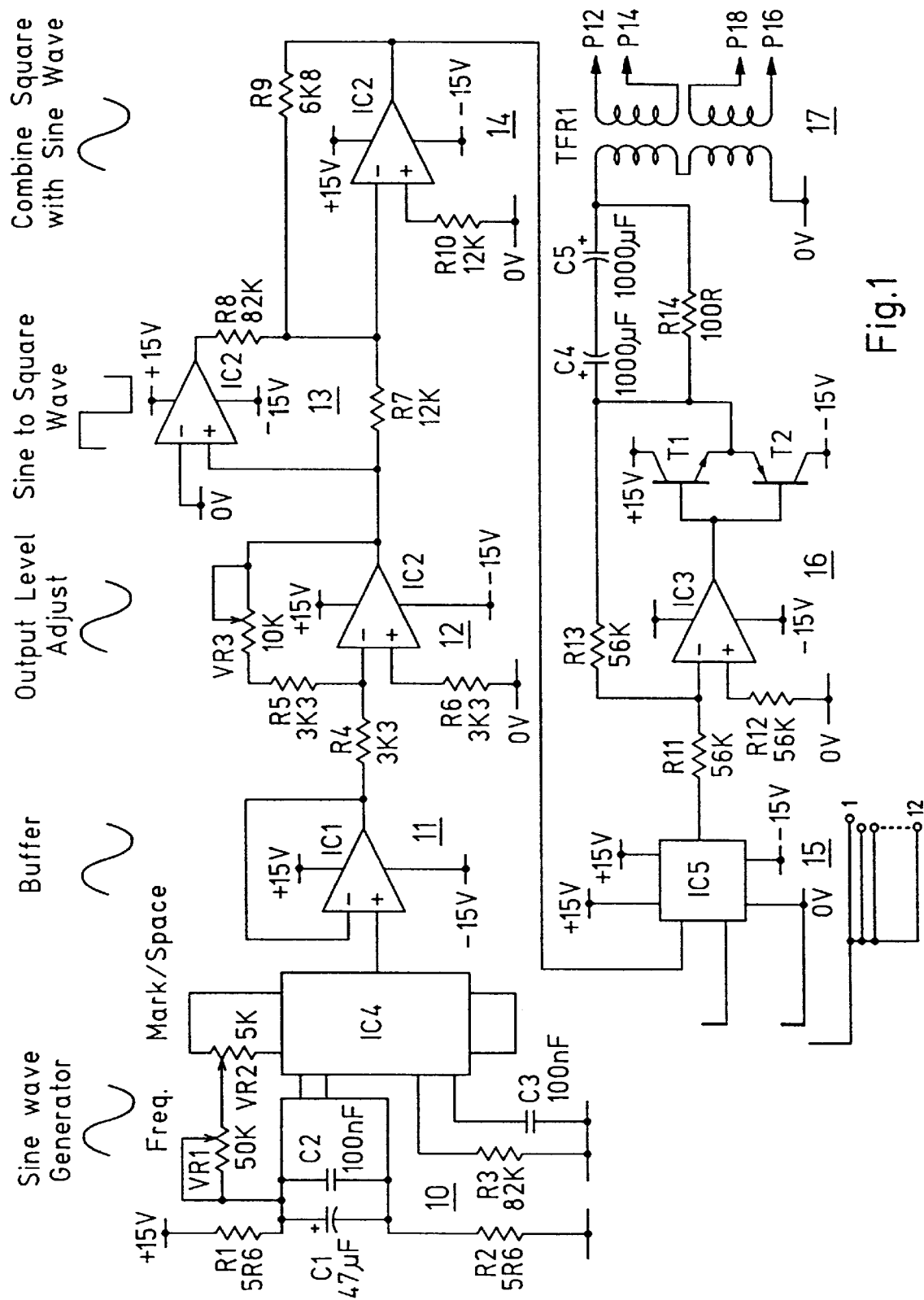

United States Patent [19]

Kettlewell et al.

[11] Patent Number: 5,954,572

[45] Date of Patent: Sep. 21, 1999

[54] CONSTANT CURRENT APPARATUS

[75] Inventors: Peter John Kettlewell; Julian Mark Sparrey; Paul Griffiths, all of Bedford; Ian Raymond Weeks, Wootton, all of United Kingdom

[73] Assignee: BTG International Limited, London, United Kingdom

[21] Appl. No.: 08/998,279

[22] Filed: Dec. 24, 1997

Related U.S. Application Data

[63] Continuation of application No. PCT/GB96/01545, Jun. 27, 1996.

[30]     Foreign Application Priority Data

Jun. 27, 1995 [GB]  United Kingdom ............... 9513018

[51] Int. Cl.⁶ ................................................. A22B 3/06
[52] U.S. Cl. ................................. 452/58; 452/59
[58] Field of Search ...................... 452/58, 59; 323/315

[56]              References Cited

U.S. PATENT DOCUMENTS

| | | | |
|---|---|---|---|
| 3,555,594 | 1/1971 | Groover et al. | 452/58 |
| 3,981,045 | 9/1976 | Collins | 452/58 |
| 4,433,302 | 2/1984 | Davies et al. | 330/257 |
| 4,475,103 | 10/1984 | Brokaw et al. | 340/501 |
| 4,500,821 | 2/1985 | Bitting et al. | 318/254 |
| 4,532,481 | 7/1985 | Meza | 330/288 |
| 4,855,618 | 8/1989 | Brokaw | 307/296.6 |
| 4,859,929 | 8/1989 | Raguet | 323/316 |
| 5,180,932 | 1/1993 | Bengel | 307/353 |
| 5,252,910 | 10/1993 | Agaesse | 323/315 |
| 5,306,200 | 4/1994 | Ripol | 452/58 |
| 5,341,109 | 8/1994 | Ryat | 330/288 |
| 5,373,253 | 12/1994 | Bailey et al. | 330/288 |
| 5,401,209 | 3/1995 | Ripol et al. | 452/58 |
| 5,433,658 | 7/1995 | Kettlewell et al. | 452/59 |
| 5,467,053 | 11/1995 | Wuidart et al. | 327/551 |
| 5,487,698 | 1/1996 | Kettlewell et al. | 452/58 |
| 5,489,981 | 2/1996 | Killpatrick et al. | 356/350 |
| 5,514,949 | 5/1996 | Bross | 452/58 |
| 5,781,058 | 7/1998 | Sanzo et al. | 327/387 |

FOREIGN PATENT DOCUMENTS

| | | |
|---|---|---|
| 356570 | of 1998 | European Pat. Off. . |
| 4020609 | 1/1992 | Germany ............................... 452/58 |
| 408331757 | 12/1996 | Japan ............................... H02H 9/02 |
| WO 93/07757 | 4/1993 | WIPO . |

OTHER PUBLICATIONS

J. Agric. Engng. Res., Kettleworth et al. "Electrical Stunning of Chickens", Feb. 10, 1990. pp. 139–151.

British Poultry Science, Sparrey et al, "Model of Current Pathways in Electrical Water Bath Stunners Used for Poultry", Sep. 19, 1991. pp. 907–916.

*Primary Examiner*—Michael J. Carone
*Assistant Examiner*—Fredrick T. French, III
*Attorney, Agent, or Firm*—Pillsbury Madison & Sutro LLP

[57]            ABSTRACT

The invention is a current controller for use in, for example, automatic animal stunning equipment.

A problem in the past has been that animal stunning equipment has not always stunned animals sufficiently humanely prior to slaughter. For example, when a short circuit has occurred and an animal is not sufficiently stunned, the animal has suffered trauma prior to slaughter. Regulations are now being introduced so as to minimise such trauma.

The invention solves this problem by providing an improved Wilson mirror constant current generator which can operate in high voltage circuits, with good dynamic response, thereby ensuring the preferred current is always applied to correctly stun an animal.

11 Claims, 5 Drawing Sheets

CONSTANT CURRENT APPARATUS

This is a continuation of International Appln. No. PCT/GB96/01545 filed Jun. 27, 1996 which designated the U.S.

This invention relates to a constant current apparatus for the supply and the control of an electric current applied to a variable load. The invention is particularly, but not exclusively, suitable for use in animal stunning and/or slaughtering equipment.

Animals such as poultry and rabbits are stunned before slaughter for humane reasons as well as to ensure that the quality of the flesh is not reduced. Electrical stunning is widely employed in poultry slaughter and there are Regulations which closely define the stunning action in terms of current and time. An animal can be slaughtered rather than just stunned by using an electric current and the invention encompasses the control of such currents. Animals such as cattle and sheep can also be stunned or slaughtered by such a controlled electric current.

To achieve economic results poultry is slaughtered at a rate of some thousands per hour, the poultry being suspended head down from individual units on a conveyor for stunning before slaughter. Typically the poultry suspended on the conveyor is carried to a water bath positioned so that the head of the suspended bird is submerged a short distance while being moved through the water bath by the continuing action of the conveyor. The immersing of the head in the water of the bath completes an electrical circuit from a source of electrical energy, through the suspension unit, the suspended bird, the water and then the return to the source. The source is arranged to supply the appropriate current to conform to the Regulations.

While the general principle of the arrangement just described is not wholly unsatisfactory there are several shortcomings which have become apparent as more detailed knowledge of the stunning process has become available.

Two papers give information on the stunning process and indicate some of the short comings of present techniques. These papers are "Electrical Stunning of Chickens, P. J. Kettlewell and R. N. Hallworth, J. Agric. Eng. Res. (1990) vol.47, pp139 to 151" and "Model of Current Pathways in Electrical Water Bath Stunners used for Poultry, J. M. Sparrey, M. E. R. Paice and P. J. Kettlewell, British Poultry Science (1992), vol.33, pp907 to 916" and reference is directed to these. The papers refer to the problems of different electrical resistance from bird to bird, variation of length of the suspended bird affecting the electrical path, variation of the numbers of birds being stunned at a given instant, splashes of water and chance contact from bird-to-bird among others. The conclusion is reached that a constant current for each bird is required. Patent publication WO 93/07757 describes a feedback regulated constant current circuit. This circuit requires a current sensor for each current path and a circuit of some complexity. Also, because of the closed loop nature of the circuit (as a result of the feedback signal), instabilities have been encountered. This problem is even more acute when sinusoidal (AC) currents are used to stun birds. Alternating currents (AC) have been found to cause fibrillation and to stun/slaughter more effectively.

It is an object of the invention to provide an improved constant current stunning controller which in a preferred embodiment is suitable for use on an individual bird or several birds on a conveyor.

According to the present invention there is provided a constant current apparatus, for supplying a constant current through a variable load in a high voltage circuit comprising: a low voltage circuit, having a low voltage controller, said low voltage circuit provides a signal, indicative of the desired current to pass through the load, said signal is input to a Wilson mirror, means for connecting the output of the Wilson mirror to the load in the high voltage circuit, via a means for protecting the output of the Wilson mirror against over voltage, said Wilson mirror output thence being connected to the variable load, thereby ensuring that a substantially constant current passes through said variable load.

According to another aspect of the invention there is provided an electrical current for a controller for animal stunning and/or slaughter having a low voltage circuit including means to set a chosen current value in said circuit, a high voltage circuit to provide current of at least a stunning level and a potential adequate to ensure said at least stunning current flows in an animal and any associated current carrying constraining means on connection in said circuit energised in operation, and means to link the low voltage circuit to the high voltage circuit to exert control of the high potential at least stunning current to a known relationship to the set chosen current value.

The means to link the low voltage and high voltage circuit may be a current mirror.

The controller may include means to shape a drive wave form for input to the low voltage circuit. The controller may have a bipolar drive wave and bipolar high voltage supplies.

The controller may include a common means to shape a drive wave form and a multiplicity of linked low and high voltage circuits for respective current flow together with voltage isolating means between the common means and the linked low and high voltage circuit to provide a multiposition stunning current arrangement for a poultry slaughter conveyor.

The controller may be arranged in a portable unit as a stunning or slaughter device for an individual animal.

According to another aspect of the invention there is provided a method of animal stunning and/or slaughter using electric current including providing a high voltage supply of stunning and/or slaughter current, arranging said supply in a series path with means for selective application of regulated current to an animal for stunning and/or slaughter and a solid state current regulating circuit portion having a control input, establishing a current determining circuit portion having a drive signal input and a current determining output and applying said current determining output thereof to said control input and further providing a drive signal source for application to said input whereby the stunning and/or slaughter current value in said series path is regulated to a value set by said drive signal source and said current determining circuit portion.

The input control current to the first bipolar transistor of the Wilson Mirror is mirrored by a second bipolar transistor to form the output current. The first and second high voltage field effect transistors act as a series pass regulator in the collector circuit of the second bipolar transistor fixing its collector voltage and thus optimising its inherent constant current characteristic. Furthermore the output transistor of the Wilson mirror is protected from over voltage and secondary breakdown conditions over the full range of output loads, by this regulator action.

Preferably the Wilson mirror is for use with high voltage supply, typically in excess of 200 V and in conditions where there is variable output load. Other applications of the controller may be in specialist welding, such as MIG and TIG welding telecommunications and control of Piezoelectric (PZT) devices.

Preferably a series pass regulator is in the form of high voltage Field Effect Transistors, arranged at the output of the Wilson mirror. However, it will be appreciated that other components exist which could be used to perform this purpose, for example a shunt arrangement.

Automatic detection means may be provided in order to check whether an animal has been properly stunned/slaughtered. If the detection means reveals that the animal is still alive apparatus may be provided for alerting an operator of this. For example a food dye marker may be squirted onto the animal which has not been stunned/slaughtered so that it may be removed and humanely killed. This avoids unnecessary trauma being suffered by the animal. The detection means and apparatus for applying a food dye may be electronically controlled and synchronised.

Figure 2A:
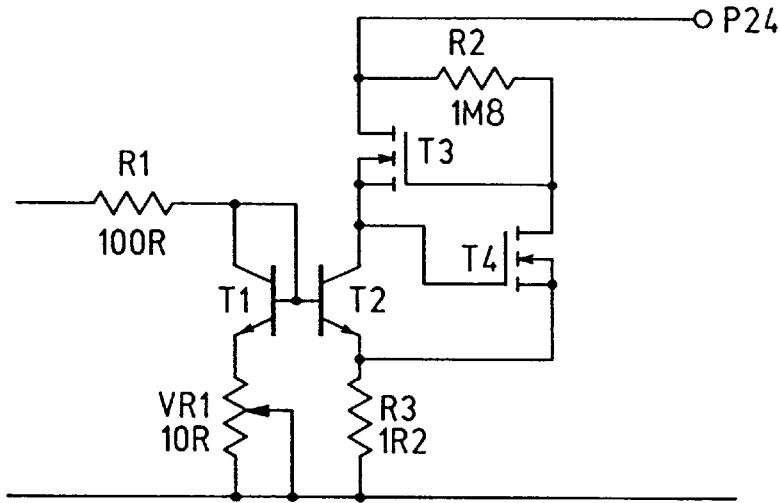
Figure 2B:
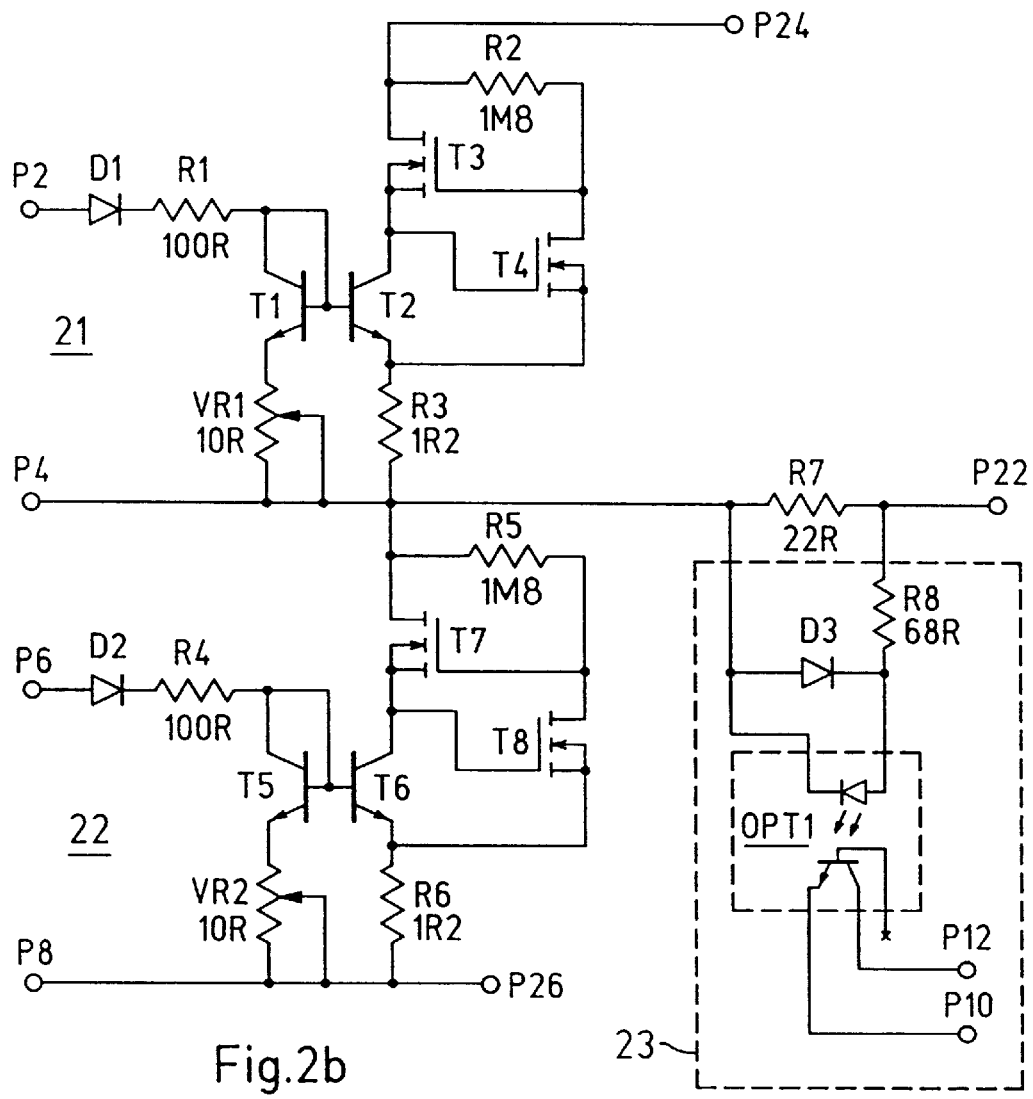
Figure 3:
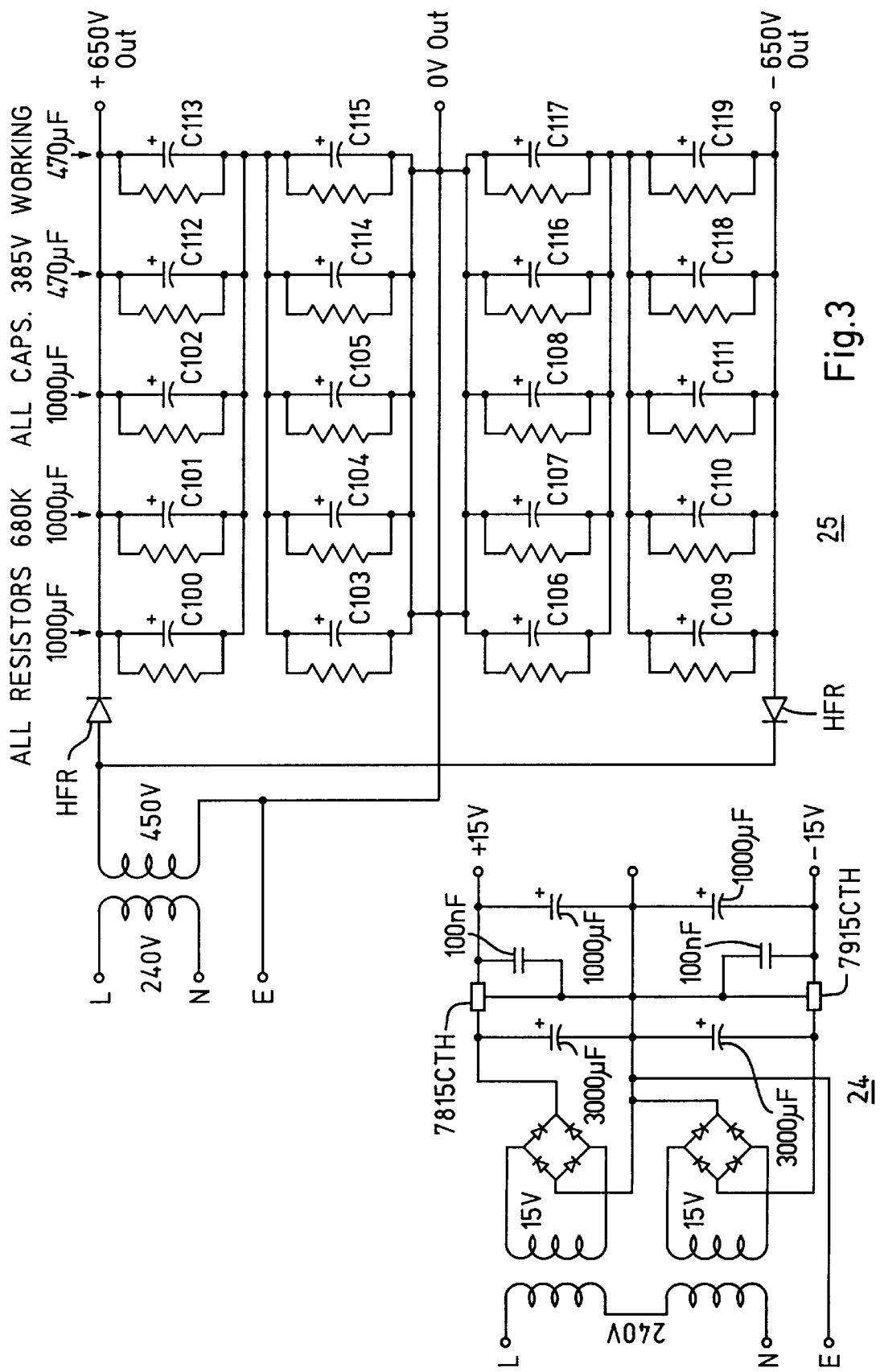

Embodiments of the invention will now be described with reference to the accompanying drawings in which:

FIG. 1 shows oscillator and wave-shaping circuit stages of a stunning current controller embodying the invention, FIGS. 2a and 2b show the current output stage for the controller of FIG. 1, FIG. 3 shows the power supply stages for the circuits of FIG. 1 and 2a, 2b and FIG. 4 and 5 show in elevation and plan a general view of parts of the stunning stage of a poultry slaughter conveyor equipped with an embodiment of the invention.

FIG. 1 shows a first part of the controller circuit where a wave form is produced. Portion 10 of the circuit is a sine wave generator including an integrated circuit IC4 (type 8038) and associated resistors and capacitors to select the frequency and mark/space ratio of the generator output. Portion 11 is a buffer stage, using one unit of an integrated circuit IC1 (type 358), which reduces the loading by subsequent circuit portions on the generator. Portion 12, using another unit of an integrated circuit IC2 (type 358), provides control of the amplitude of the sine wave. The output of portion 12 is supplied to a squarer, portion 13, and a combiner portion 14, both of which portions employ units of an integrated circuit IC2 (type 358). The sine wave from portion 12 is formed into a square wave at the output of portion 13. The sine wave from portion 12 is also supplied to the input of portion 14 in which portion the square wave and sine wave are combined to form a wave shape in which the upper and lower sections are sinusoidal with effectively instantaneous transitions of significant amplitude between the sections at each zero crossing.

The circuit described so far provides a wave form which is supplied to a driver stage, the key portions are referred to by reference numerals portions 15, 16 and 17 in the lower section of FIG. 1 and then to a high voltage constant current stage as shown in FIGS. 2a and 2b.

Portion 16 is a driver providing a bi-directional output to an isolating transformer splitter stage 17.

The output of the transformer splitter 17 is connected as indicated by the references P12, P14, P16, P18 to the high voltage stage shown in FIG. 2b. This stage consists of two similar portions 21, 22 and an optional portion 23 (described later). Each portion 21, 22 includes a current mirror T1, T2 and T5, T6 respectively. Diodes D1 and D2 act to permit current flow in portion 21 on positive half cycles of the combined sine and square wave and in portion 22 on negative half cycles. The diodes D1 and D2 interact with the instantaneous zero crossing portions of the sine/square wave. The action of the current mirror is achieved by setting a current through device T1 or T5 respectively (device type BU508) with resistor R1 or R4. Variable resistors VR1, VR2 provide adjustment for device characteristic differences. The set current is "mirrored" by devices T2 or T6 (device type BU508) from the $V_{be}$ of devices T1, T5 respectively. The current flow through devices T2 and T6 is from respective positive and negative high voltage supplies P24 and P26. The voltage limit for a device type BU508 is 700 volts but a higher voltage is needed to drive the stunning current. Devices T3, T4 and T7, T8 respectively permit the higher voltage to be used. Devices T3 and T7 are controlled by devices T4 and T8 respectively to drop excess voltage with two benefits. First the voltage across devices T2 and T6 is limited to a safe value. Second the variation of voltage across devices T2 and T6 is reduced, improving the current mirror action. The low voltage current drive in devices T1 and T5 is converted by the current mirror action to a high voltage current drive of the same current value. Thus as a constant current is always supplied, there is no need for any feedback loop.

The output at P22 is a waveform corresponding to the sine/square waveform at the output of portion 14 with a constant current set by the current mirror and a voltage swing provided by the high voltages at P24 and P26.

The power supplies are shown in FIG. 3. Portion 24 provides positive and negative 15 volt supplies for the low voltage portions of the circuits in FIGS. 1 and 2 and is conventional in form. Portion 25 provides the high voltage supplies with a suitably low source impedance. As stunning currents are about 100 milliamps and several birds are to be stunned at a time a current of 500 milliamps to one ampere may be needed. The power supply portion 25 is to produce a +650 volt/−650 volt output, i.e. direct current. However alternating current may also be used if the wave shaping circuit is supplied with the alternating current frequency. The capacitors C100–C111 all have a value of 1000 $\mu$F. Capacitors C112 to C119 all have capacitance of 470 $\mu$F. All capacitors are suitable for high voltage (e.g. 385 V) applications.

As described so far a single stunning "channel" has been shown. For use on a stunning conveyor numerous, say twelve, stunning channels are needed. To achieve this the output of portion 14 (FIG. 1) is supplied to twelve parallel driver stages (15, 16 and 17,) and respective constant current controllers, FIG. 2.

FIG. 2a shows a circuit of a modified Wilson mirror, which may also be used in other applications as described below. The output current is generated by T2, without T3 and T4 the high voltage supply would distribute between the load and T2. At lower resistance loads the majority of the voltage would appear across T2 reducing reliability (due to voltage stress and secondary breakdown effects). In this circuit, when the voltage across T2 reaches the gate threshold voltage of T4; T4 allows current to pass through resistors R2 and R3, hence reducing the gate to source voltage of T3. This causes an increase in resistance between T3's source and drain terminals. Similarly if the voltage across T2 falls due to increased load resistance, then the effective resistance of T3 is reduced. This action maintains the collector to emitter voltage of T2 at around the threshold voltage of T4 (typically five volts with device used). Hence the high voltage supply is now effectively distributed between the load and T3. Furthermore because T3 is a field effect transistor it is not susceptible to secondary breakdown problems at high voltages.

Figure 4:
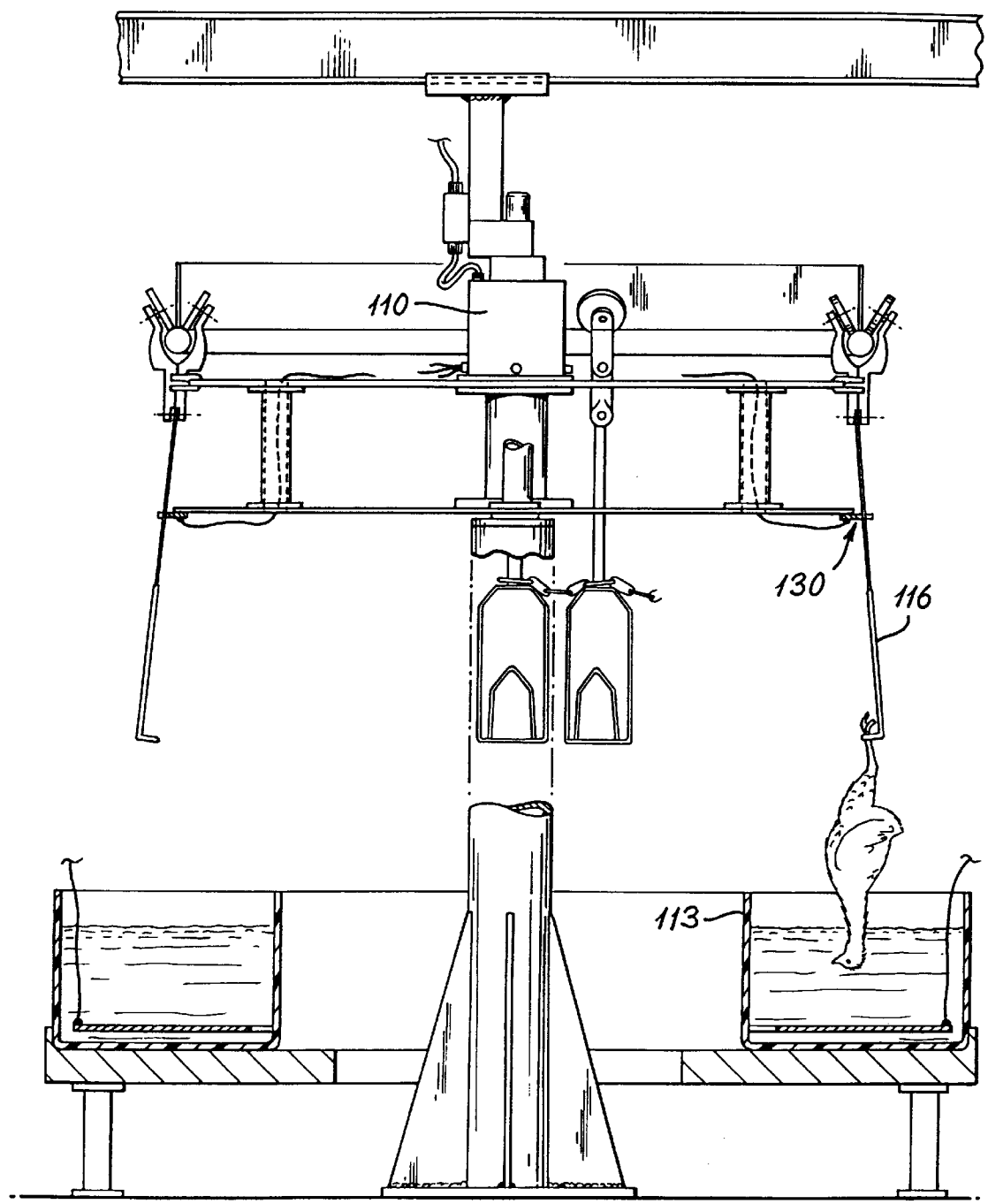
Figure 5:
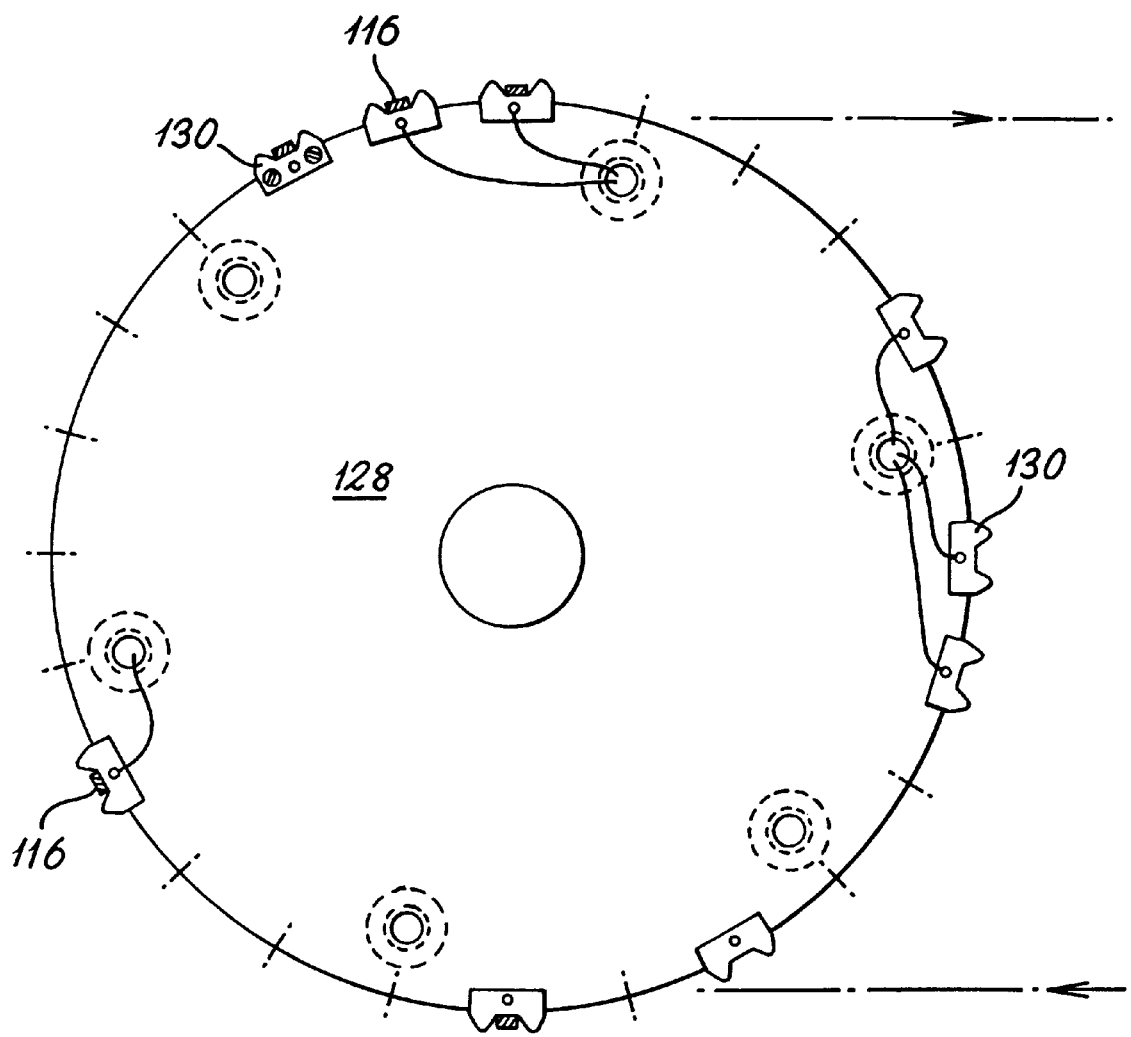

FIGS. 4 and 5 show parts of a stunning section of a poultry slaughter conveyor and water bath more fully described in a co-pending patent application of even date entitled "An apparatus for passing an electrical current through poultry and the like". This conveyor is designed to have twelve distinct stunning current supplies via respective slip rings in unit 110 to twelve opposed contact element pairs (twenty four in total) (130) spaced around a circular disc (128). Thus each distinct supply is connected to two contact elements on opposite sides of the disc. In use only one of these contact elements will be in contact with a bird suspension unit, 1116, and preferably displaces the suspension unit against the load of the bird, as shown in FIG. 4.

The various circuit portions described with reference to FIGS. 1, 2a and 2b and 3 are enclosed in a cabinet a safe distance from the conveyor and the twelve distinct high voltage, constant current outputs connected over suitably insulated conductors to the slip rings.

A return path is provided from an electrode plate in the water bath, 113.

So far only general reference has been made to specific stunning currents. The current mirror permits the current to be set to a required value which will be maintained without the use of current sensors and feedback, as has hitherto been the preferred arrangement. Furthermore in a feedback system the current value will take a certain time to reach the required value. This time can be as much as one or two seconds during which the current will go through a wide range of values as a rapid oscillation. Such time is a significant part of the stunning time and could affect the stunning action. The constant current controller now provided by the technique described above achieves the required value almost instantaneously and then has a steady condition. Clearly current values and duration and a high voltage supply value will be chosen appropriate to the animal and whether stunning or slaughter is required.

The Regulations require a current of 105 milliamps and an immersion time of two to four seconds for chickens and this requirement can be met with the technique described above, despite variation of bird resistance and other variables. Values for the resistance of the path including the suspended bird can be from below 1000 ohms to above 3000 ohms, the actual bird being up to 1500 ohms, so at least 300 volts rms must be available from the high voltage supply, and more should be provided to allow for circuit resistance and impedance.

As described so far, the current controllers energise the contacts via the slip rings all the time and the timing and duration of the stunning current is controlled by the contact between the suspension units and the contact elements, so the speed of the line will affect the duration of current. If required the timing and duration of the current could be determined by portion 15 of FIG. 1 being operated by a signal derived from the speed of the conveyor and the position of the contact disc, or other suitable means. This would overcome problems where variation of line speed adversely affects stunning conditions.

A single channel constant current controller could be used for on-farm culling, providing the required constant current for the Regulations.

The current cycles and thus current duration can be monitored using circuit portion 23 and data recorded using a personal computer. The duration monitor facility is appropriate for a single channel controller for on-farm culling.

Details of the electronic circuits not given above will be readily apparent to those skilled in the art as will variations of devices used and the addition of spike suppression and like techniques, particularly in the high voltage regions of the controller.

Although specific reference has been made to a current controller for use with animal stunning and/or slaughtering equipment, it will be appreciated that the current controller may be suitable for applications in other applications where there is a rapidly varying high voltage supply and wherein a constant current supply is required. Such applications may include telecommunication and broadcast systems, such as klystrons and magnetrons, electroplating systems, or any other electrically "noisy" or unstable environments in which a constant current is required.

We claim:

1. A method of animal stunning or slaughter using electric current including providing a high voltage supply of stunning and/or slaughter current, arranging said supply in a series path with means for selective application of regulated current to an animal for stunning and/or slaughter and a solid state current regulating circuit portion having a control input, establishing a current determining circuit portion having a drive signal input and a current determining output and applying said current determining output thereof to said control input and further providing a drive signal source for application to said input whereby the stunning and/or slaughter current value in said series path is regulated to a value set by said drive signal source and said current determining circuit portion.

2. An electrical current controller for animal stunning or slaughter having a low voltage circuit including means to set a chosen current value in said circuit, a high voltage circuit to provide current of at least a stunning level and a potential adequate to ensure said at least stunning current level in an animal and any associated current carrying constraining means on connection in said high voltage circuit energised in operation, and means to link the low voltage circuit to the high voltage circuit to exert control of the potential at least stunning current to a known relationship to the set chosen current value.

3. A constant current apparatus, for supplying a constant current through a variable load in a high voltage circuit comprising: a low voltage circuit, having a low voltage controller, said low voltage circuit provides a signal, indicative of the desired current to pass through the load, said signal is input to a Wilson mirror, means for connecting the output of the Wilson mirror to the load in the high voltage circuit, via a means for protecting the output of the Wilson mirror against over voltage, said Wilson mirror output thence being connected to the variable load, thereby ensuring that a substantially constant current passes through said variable load.

4. Apparatus according to claim 1, wherein the means for protecting the output of the Wilson mirror in the high voltage circuit comprises at least two high voltage Field Effect Transistors (FET's) arranged in the form of a series pass regulator.

5. Apparatus according to claim 1, having means for providing an alternating current, with respect to time, in the high voltage circuit.

6. Apparatus according to claim 5, wherein a bridge arrangement is included in the low voltage circuit so that the Wilson mirror emulates input current on both positive and negative half waves.

7. Apparatus according to claim 5, wherein the low voltage controller includes means to shape a wave form for input to the low voltage circuit.

8. Apparatus according to any one of the preceding claims comprising a shackle arrangement and arranged to control automatic stunning equipment for use in at least one of an animal stunning and slaughtering apparatus.

9. Apparatus according to claim 8, wherein a waveform shaping means is provided to shape a wave form and a multiplicity of linked low and high voltage circuits for respective current flow, together with voltage isolating means between the waveform shaping means and the linked low and high voltage circuit, so as to provide a multi-position stunning current for a poultry slaughter apparatus.

10. Apparatus according to claim 8 for use in an animal slaughter apparatus, wherein automatic identification means is provided to identify any animal which has not been properly stunned.

11. Apparatus according to claim 9, wherein the identification means includes a dispenser of a coloured dye which is automatically actuated to dispense dye onto an animal which has not been properly stunned.

* * * * *